Figure 1:
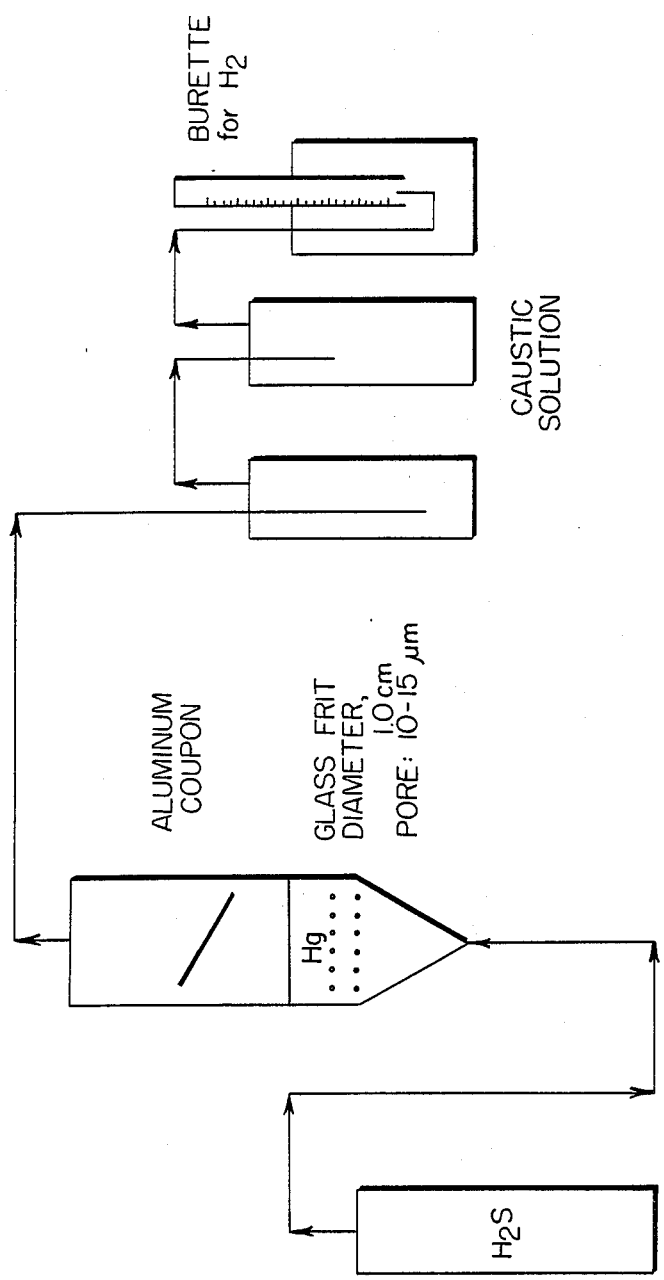

United States Patent

Yan

[11] Patent Number: 4,764,219
[45] Date of Patent: Aug. 16, 1988

[54] CLEAN UP AND PASSIVATION OF MERCURY IN GAS LIQUEFACTION PLANTS

[75] Inventor: Tsoung Y. Yan, Philadelphia, Pa.

[73] Assignee: Mobil Oil Corporation, New York, N.Y.

[21] Appl. No.: 923,245

[22] Filed: Oct. 27, 1986

[51] Int. Cl.[4] .................. B01D 53/34; C09K 3/00
[52] U.S. Cl. .................. 134/2; 148/DIG. 17; 165/5; 252/8.3; 252/8.552; 252/8.555; 252/87; 422/7; 422/9; 423/210
[58] Field of Search ............... 423/210, 561 B; 55/72; 502/516; 422/7, 9; 148/DIG. 17; 106/14.45; 165/5; 252/8.3, 8.552, 8.555, 80, 87, 89.1; 134/2

[56] References Cited

U.S. PATENT DOCUMENTS 3,981,740 9/1976 Czajkowski ..................... 422/7
4,044,098 8/1977 Miller et al. ..................... 423/561 B

FOREIGN PATENT DOCUMENTS 72199 10/1975 Australia ..................... 423/210
84722 5/1982 Japan ..................... 423/210
20224 2/1983 Japan ..................... 423/210
833287 5/1981 U.S.S.R. ..................... 423/210

OTHER PUBLICATIONS

The Analytical Chemistry of Sulfur and its Compounds, Kartchmer, ed. Wiley-Interscience, 1970, pp. 465, 467.

Primary Examiner—John Doll
Assistant Examiner—Jeffrey Edwin Russel
Attorney, Agent, or Firm—Alexander J. McKillop; Michael G. Gilman; Van D. Harrison, Jr.

[57] ABSTRACT

Gas liquefaction apparatus contaminated with mercury is decontaminated by circulating through the apparatus a solvent containing sulfur or a gas containing a sulfur reactant such as sulfur, hydrogen sulfide or alkyl thiol.

12 Claims, 1 Drawing Sheet

CLEAN UP AND PASSIVATION OF MERCURY IN GAS LIQUEFACTION PLANTS

NATURE OF THE INVENTION

This invention relates to the purification of natural gas. More specifically, this invention relates to a method for removing and cleaning gas liquefaction apparatus which has been contaminated with mercury.

BACKGROUND OF THE INVENTION

Raw natural gas must be treated prior to its liquefaction for several reasons. These include removing compounds which interfere with the liquefaction process, with the separation and recovery of hydrocarbon liquids and with meeting the specifications set for the recovered products. For example, the gas must be dried to prevent ice formation during cryogenic operations. Hydrogen sulfide ordinarily must be removed because of its toxic nature. A large number of commercial processes are in use for treating and separating of raw wellhead gas. The steps used in these different processes are each well known to those skilled in the art.

Some natural gas contains mercury at levels as high as 200 to 300 micrograms per cubic meter. For example, the mercury level of natural gas produced at one field in Indonesia is about 250 micrograms per cubic meter. Concentrations of mercury at this level creates safety hazards and air pollution problems. Refinery equipment such as heat exchangers can be adversely effected by the action of accumulated mercury. The problem of mercury in natural gas is discussed further in U.S. Pat. No. 4,094,777 and French Pat. No. 2,310,795, both of which are incorporated herein by reference.

Crude natural gas containing mercury ordinarily is treated by first flowing it through a bed containing sulfur distributed over a carbon support. The free sulfur present reacts with mercury in the natural gas and removes it from the natural gas. The gas is then contacted with an alkali carbonate to remove the carbon dioxide and hydrogen sulfide present in the gas and subsequently is treated by liquid amine extraction to remove any residual hydrogen sulfide. The gas is then dehydrated to remove water and finally is cooled and liquefied after treatment in a heat exchanger. It is the heat exchange equipment which is a primary source of problems resulting from mercury contamination. Ordinarily the heat exchangers are made of aluminum which is easily corroded and ultimately destroyed by the cumulative effect of mercury present in the natural gas.

Although the mercury can be removed by contact with the sulfur-on-carbon absorbent, the mercury content can be lowered only to a level of from 250 to 0.03 micrograms per cubic meter. This lower level is considered to be the minimum concentration achievable under the prevailing thermodynamic limitations. As the mercury removing system ages, however, the mercury level in the effluent gas will increase up to 0.1 micrograms per cubic meter or higher over a number of years. The mercury content thus may reach levels which are considered too high for the continued safe operation of the aluminum heat exchangers. This is because the mercury tends to condense on the cold surfaces of the heat exchanger and there to react with the aluminum leading to its ultimate corrosion and failure.

Furthermore operating experience has shown that the mercury-removing equipment upstream (e.g. sulfur-on-carbon absorbent beds) sporadically malfunctions. Consequently mercury in the natural gas is not removed but is carried through the gas system to a point where it contacts aluminum equipment such as the heat exchangers. This malfunction of the upstream mercury removal equipment has been found to contribute significantly to the overall mercury corrosion problem.

Even though the mercury does not immediately react with the aluminum it may still tend to accumulate on the surface of the aluminum and where the aluminum is not protected by a shield of aluminum oxide or if the aluminum oxide coating becomes scratched, the mercury will further react with the aluminum.

A primary purpose of this invention therefore is to provide a method of passivating, or rendering non-reactive, residual mercury present in gas liquefaction equipment. Still another object of this invention is to prevent the further corrosion and deterioration of gas liquefaction equipment that has become contaminated by the accumulation of mercury.

SUMMARY OF THE INVENTION

Briefly stated, this invention comprises passivating, or rendering non-reactive mercury present in equipment to render the mercury harmless by contacting the equipment with a flowing stream of gas containing a sulfur-containing reactant or a liquid solution containing sulfur or a sulfur compound either when the equipment is in use or when use of the equipment has been suspended for purposes of repair and renewal.

DESCRIPTION OF THE INVENTION

Applicant's application can be utilized in at least two aspects, one directed to the situation where the particular gas treating facility has been shut down (unit turnaround) and the other to the situation where the gas continues to be processed and it is desirable to effect mercury passivation during the gas processing phase.

In a system where all activity toward liquefying the natural gas has been suspended and the system is undergoing renovation and repair, the mercury on the contaminated apparatus can be removed by circulating through it a solvent such as benzene, toluene, methanol, butane, propane, gas condensate, ethane, ethanol, propanol, carbon disulfide and mixtures thereof. Preferably the circulation of solvent through the apparatus is conducted at a temperature between $-40°$ C. and $-70°$ C. The solvent, after it has passed through the mercury contaminated equipment and has removed at least some of the mercury, is carried to a solvent purification system where the mercury content of the solvent is reduced or removed. Removal can be effected by contacting the solvent with sulfur, copper, bismuth, zinc, gold or silver dispersed on a carbon support or by running the solvent through a column packed with silver gauze, and by filtration. The solvent is then recycled back through the apparatus to remove more mercury. It has been determined that between 0.1 and 1 grams of mercury can be suspended in a gallon of solvent under these conditions. The solvent effectively removes the mercury from every part of the system where it circulates. Circulation of the solvent is continued until the mercury content of the solvent is reduced to less than $1 \times 10^{-4}$ grams per gallon.

The above-described process can be accelerated by incorporating into the cleaning solvent dissolved sulfur, sulfides, polysulfides and colloidal sulfur in a concentration between 0.001 and 1 percent by weight and circulating the resulting mixture. The polysulfides are particularly preferred. Polysulfides which are most preferred are sodium, ammonium, and other forms which are soluble in the solvent selected for circulation in the system. For application in aluminum equipment, the pH of the resulting mixture can be lowered to below 9 by adding mineral or organic acids. Preferably the pH is maintained between 7 and 7.5. The sulfur species react with the mercury so that more total mercury can be dissolved or suspended in the solvent to accelerate the cleaning operation. Because polysulfides are very reactive, passivation can be conducted at low temperature for example, below −40° C. to alleviate mercury corrosion during the passivation operation. The effluent liquid solution is removed from the system and treated to remove mercury and mercuric sulfide such as by passing it over a column of sulfur dispersed on a carbon support or by filtration. The solvent can then be recycled.

As indicated previously, it is also possible to conduct this invention during the actual treatment of the gas. This can be effected in one of two ways.

In the first method a passivating agent, such as free sulfur, hydrogen sulfide or alkyl thiol of the formula RSH where R is a hydrocarbon chain of 1 to 10 carbon atoms, or mixtures thereof, are injected intermittently after the dehydrator and upstream of the heat exchanger. The concentration of the passivating agent in the injected stream can be between about 1 parts per bilion to about 10 ppm. Injection of the passivating agent is suspended when its presence in the amount of about 10 percent begins to appear in the natural gas product flowing to the LNG equipment. These passivating agents react, of course, with the mercury present in the apparatus and render it inactive. Much of the agent is also deposited in the system at locations where mercury will likely deposit subsequently. This contributes to the effectiveness of this aspect of the invention.

If gas processing can be suspended while the equipment is being treated for mercury contamination, a reactive sulfur gas such as hydrogen sulfide, alkyl thiols, free sulfur or other gas can be circulated through the equipment until a suitable degree of passivation is attained.

In another aspect of the invention a scrubber is positioned immediately after the dehydrator unit to remove heavy hydrocarbons such as butanes and pentanes plus. This scrubber solvent is saturated with free sulfur which reacts with mercury present in the gases being scrubbed to form small amounts of harmless mercuric sulfide which are separated out by sedimentation or filtration. The temperature in the scrubber is sufficiently low, for example, 0° F., so that the thermodynamic limitations of the reaction for mercury removal are greatly improved.

Of the procedures discussed above the method utilizing anhydrous hydrogen sulfide gas in the liquid or gas phase is considered to be the best mode and preferred method. At a temperature of −10° C. the mercury is sufficiently liquid to facilitate reaction with the hydrogen sulfide but it will not harm the aluminum surfaces it contacts.

At a time when it is proposed to passivate the mercury in a section of equipment dry hydrogen sulfide gas is introduced into the section either in gaseous form or in solution in a liquid hydrocarbon such as liquid butane. The section is maintained at a pressure of 0 to 100 psig and a temperature of −10° C. for a period of one to two days to complete the passivation reaction. The same conditions are used if other sulfur-containing materials are used in lieu of hydrogen sulfide. When the passivation reaction is completed, the temperature of the section is increased further to volatilize any other condensed liquids in the section. In a final step the system is purged of hydrogen sulfide, mercuric sulfide and other debris by flushing with a natural gas or liquid, such as liquid butane.

Use of anhydrous hydrogen sulfide gas is believed to be important. Moisture carried in with the gas could aggravate mercury corrosion. Dry hydrogen sulfide is also preferred because of its reactivity and relative simplicity in handling.

EXAMPLES

I

Deposition of Mercury from Vapor onto Aluminum

The deposition of mercury from the LNG in an aluminum heat exhanger was simulated in the following procedure. An aluminum coupon of $1\frac{1}{4} \times 1\frac{1}{4} \times 1/16$ inches with a hole of $\frac{1}{8}$-inch diameter at the center was thoroughly polished with steel wool. The coupon was placed horizontally in a Soxhlet extractor without the thimble. In the flask of the extractor 250 cc of toluene and 5 grams of mercury were heated to boiling (110° C.). The toluene vapor containing the mercury was condensed and the condensate flowed over the coupon. This refluxing operation was continued for about 20 hours. The mercury condensed along with the toluene was deposited on the coupon. The coupon with the mercury deposit was examined with a microscope. Examination showed the definite presence of mercury globules on the aluminum surface.

II

Passivation of Mercury

The demonstration set-up is shown in FIG. 1. Mercury (10 grams) was charged to a glass tube fitted with a medium glass frit of 1 cm diameter. An aluminum coupon was hung in the space to show any effects of dry hydrogen sulfide gas on aluminum. Hydrogen sulfide gas was introduced from the bottom and bubbled slowly through the mercury for 6 hours. The excess hydrogen sulfide gas was scrubbed with caustic solution. The remaining gas was hydrogen produced in the reaction between hydrogen sulfide and mercury. By measuring the rate of hydrogen gas evolved, one can calculate the reaction rate between mercury and hydrogen sulfide. In the interim the aluminum coupon was visually inspected and showed no visible reaction with the dry hydrogen sulfide.

A similar test was conducted in which the mercury was immersed in n-hexane. The result showed that the reaction between mercury and the dissolved hydrogen sulfide was considerably slower than that with dry hydrogen sulfide gas.

III

Reactivity of Mercury in Cold Solvent

A mixture of solvents (methanol, 90% and acetone, 10%) was chilled to −60° C. The methanol contained 200 ppm of sodium polysulfide. Mercury was then dropped into the solvent where it solidified instantly. After one-half hour the formation of a black film of mercuric sulfide on the surface of the mercury was observed. The film flaked into specks of black particles. This example shows that the reaction of mercury with polysulfides is rapid at low temperatures, and the mercuric sulfide produced is easily removed from surfaces during the circulation of the solvent mixture.

What is claimed is:

1. A process for passivating mercury present as a contaminant on gas processing equipment comprising contacting said mercury with a liquid solvent containing at least in part sulfur or a sulfur-containing compound selected from the group consisting of free elemental sulfur, colloidal sulfur, hydrogen sulfide, monosulfides, polysulfides and alkyl thiols said liquid solvent being selected from the group consisting of benzene, toluene, methanol, butane, propane, gas condensate, ethane, ethanol, propanol, carbon disulfide and mixtures thereof.

2. The process of claim 1 wherein the sulfur or sulfur-containing compound is free elemental sulfur or colloidal sulfur.

3. The process of claim 1 wherein the sulfur-containing compound is hydrogen sulfide.

4. The process of claim 1 wherein the sulfur-containing compound is an alkyl thiol of the structure RSH where R is an alkyl group of 1 to 10 carbon atoms.

5. The process of claim 1 wherein the sulfur containing compound is selected from the group consisting of sodium polysulfide and ammonium sulfide and mixtures of the two.

6. The process of claim 1 wherein the process is conducted at a temperature between about −10° C. and −70° C.

7. A process for passivating mercury present as a contaminant on gas processing equipment comprising contacting said mercury with a liquid solution containing, at least in part, sulfur or a sulfur-containing compound selected from the group consisting of free elemental sulfur, colloidal sulfur, hydrogen sulfide, monosulfides, polysulfides and alkyl thiols and a liquid solvent selected from the group consisting of benzene, toluene, methanol, butane, propane, gas condensate, ethane, ethanol, propanol, carbon disulfide and mixtures thereof.

8. The process of claim 7 wherein the sulfur or sulfur-containg compound is free elemental sulfur or colloidal sulfur.

9. The process of claim 7 wherein the sulfur-containing compound is hydrogen sulfide.

10. The process of claim 7 wherein the sulfur-containing compound is an alkyl thiol of the structure RSH where R is an alkyl group of 1 to 10 carbon atoms.

11. The process of claim 7 wherein the sulfur-containing compound is selected from the group consisting of sodium polysulfide and ammonium sulfide and mixtures of the two.

12. The process of claim 7 wherein the temperature is between about −10° C. and −70° C.

* * * * *